United States Patent
Koenig et al.

(10) Patent No.: US 10,890,077 B2
(45) Date of Patent: Jan. 12, 2021

(54) ANTI-FRET LINER

(71) Applicants: Rolls-Royce Corporation, Indianapolis, IN (US); Rolls-Royce plc, London (GB)

(72) Inventors: Eric Koenig, Fishers, IN (US); Michael J. Whittle, Derby (GB); Daniel K. Vetters, Indianapolis, IN (US)

(73) Assignees: Rolls-Royce Corporation, Indianapolis, IN (US); Rolls-Royce plc

( * ) Notice: Subject to any disclaimer, the term of this patent is extended or adjusted under 35 U.S.C. 154(b) by 137 days.

(21) Appl. No.: 16/142,835

(22) Filed: Sep. 26, 2018

(65) Prior Publication Data

US 2020/0095877 A1    Mar. 26, 2020

(51) Int. Cl.
*F01D 9/04* (2006.01)
*F01D 25/28* (2006.01)

(52) U.S. Cl.
CPC .............. *F01D 9/042* (2013.01); *F01D 9/041* (2013.01); *F01D 25/28* (2013.01); *F05D 2220/32* (2013.01); *F05D 2260/95* (2013.01)

(58) Field of Classification Search
CPC ........ F01D 9/041; F01D 9/042; F01D 25/007; F01D 25/04; F01D 25/246; F01D 25/28
See application file for complete search history.

(56) References Cited

U.S. PATENT DOCUMENTS

| | | | |
|---|---|---|---|
| 5,630,700 A * | 5/1997 | Olsen | F01D 5/189 415/134 |
| 6,325,593 B1 | 12/2001 | Darkins, Jr. et al. | |
| 6,514,046 B1 | 2/2003 | Morrison et al. | |
| 6,558,114 B1 | 5/2003 | Tapley et al. | |
| 6,648,597 B1 * | 11/2003 | Widrig | C04B 37/001 415/200 |
| 7,086,831 B2 * | 8/2006 | Harper | F01D 5/26 415/209.3 |
| 7,220,099 B2 | 5/2007 | Bekrenev et al. | |
| 7,311,495 B2 * | 12/2007 | Ashley | F01D 5/26 415/209.4 |
| 7,762,766 B2 | 7/2010 | Shteyman et al. | |
| 8,454,303 B2 | 6/2013 | Garcia-Crespo | |
| 8,616,849 B2 | 12/2013 | Menheere et al. | |
| 8,926,262 B2 * | 1/2015 | Tanahashi | F01D 5/282 415/9 |
| 8,956,105 B2 | 2/2015 | Uskert et al. | |
| 8,956,112 B2 * | 2/2015 | Tanahashi | F01D 5/282 415/200 |
| 9,068,464 B2 * | 6/2015 | Morrison | F01D 5/282 |
| 9,097,141 B2 | 8/2015 | Paradis | |
| 9,546,557 B2 | 1/2017 | Grooms, III et al. | |
| 9,915,159 B2 | 3/2018 | Huizenga et al. | |
| 10,174,627 B2 | 1/2019 | Chang et al. | |
| 10,260,362 B2 * | 4/2019 | Varney | F01D 9/044 |
| 2008/0053107 A1 * | 3/2008 | Weaver | F01D 9/023 60/800 |
| 2014/0001285 A1 | 1/2014 | Grooms, III et al. | |

(Continued)

*Primary Examiner* — Brian P Wolcott

(74) *Attorney, Agent, or Firm* — Barnes & Thornburg LLP

(57) ABSTRACT

An airfoil vane assembly includes an anti-wear device for blocking fretting on the airfoil shell and/or carrier as an interface between the airfoil shell and carrier during relative movement. The anti-wear device can be secured with one of the airfoil shell and carrier while slidingly engaged with the other.

19 Claims, 3 Drawing Sheets

(56) References Cited

U.S. PATENT DOCUMENTS

| | | |
|---|---|---|
| 2014/0255174 A1 | 9/2014 | Duelm et al. |
| 2016/0003072 A1 | 1/2016 | Chang et al. |
| 2016/0177761 A1 | 6/2016 | Huizenga et al. |
| 2016/0201488 A1 | 7/2016 | Carr et al. |
| 2016/0230593 A1* | 8/2016 | Zelesky ................ F01D 25/005 |
| 2016/0376899 A1* | 12/2016 | Prugarewicz ........... F01D 25/14 |
| | | 415/115 |
| 2017/0022833 A1 | 1/2017 | Heitman et al. |
| 2017/0051619 A1 | 2/2017 | Tuertscher |
| 2018/0045117 A1 | 2/2018 | Groves, II et al. |
| 2018/0058235 A1 | 3/2018 | Jones et al. |
| 2018/0223680 A1 | 8/2018 | Hafner |
| 2018/0328187 A1 | 11/2018 | Oke |
| 2018/0340431 A1 | 11/2018 | Kerns et al. |
| 2018/0370158 A1 | 12/2018 | Gallier et al. |
| 2019/0368363 A1* | 12/2019 | Walston ................ F01D 25/005 |

\* cited by examiner

ANTI-FRET LINER

BACKGROUND

The present disclosure relates generally to component for turbomachinery, and more specifically to components for turbomachinery such as gas turbine engines.

Gas turbine engines are used to power aircraft, watercraft, electric power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

The relatively high temperatures generated, as well as the adapted uses of such gas turbine engines, can be advantageously endured by ceramic materials. However, supporting ceramic materials can create challenges including challenges related to different thermal growth rates.

SUMMARY

The present disclosure may comprise one or more of the following features and combinations thereof.

According to an aspect of the present disclosure, a vane assembly of a gas turbine engine may include a ceramic vane shell including a pair of endwalls defining a radial gas flow path extent and a vane body extending radially between the endwalls and defining an internal cavity extending radially between the endwalls, the vane shell including at least one extension portion projecting radially from one of the endwalls beyond the radial gas flow path extent, a support carrier for supporting the vane shell, the support carrier including a spar extending radially through the internal cavity of the vane shell, and an anti-wear device for blocking against fretting between the vane shell and the support carrier. The anti-wear device may include a body secured to remain stationary with one of the vane shell and the support carrier. The anti-wear device may include an engagement leg extending from the body to engage the other of the airfoil shell and the support carrier to interface between the airfoil shell and the support carrier.

In some embodiments, the anti-wear device may be secured with the at least one extension portion. The anti-wear device may extend about the at least one extension portion. The anti-wear device may include a portion arranged within the internal cavity and a portion outside of the internal cavity. The engagement leg may be arranged within the internal cavity. In some embodiments, a bulbous portion of the body may be arranged outside of the internal cavity.

In some embodiments, the anti-wear device forms an elongated clip. The elongated clip may have a uniform cross-section along the elongated length. The elongated clip may have curvature corresponding to curvature of the at least one extension portion along the elongated length.

In some embodiments, the engagement leg may contact each of the vane shell and the support carrier. The anti-wear device may remain stationary with the vane shell and the support carrier may be slidingly engaged with the engagement leg to permit relative movement.

In some embodiments, the vane shell may include a keeper arm extending from one of the endwalls. The keeper arm may form a pocket for receiving a free end of the anti-wear device. In some embodiments, the at least one extension portion may include a thickened radial end. The thickened radial end may correspond to the shape of the body of the anti-wear device. In some embodiments, the anti-wear clip may include a plurality of sections disposed at different circumferential positions along the circumference of the at least extension portion. The plurality of sections may be spaced apart from each other.

According to another aspect of the present disclosure, an airfoil assembly of a gas turbine engine may include a ceramic airfoil shell including a pair of endwalls defining a radial gas flow path extent and an airfoil body extending radially between the endwalls and defining an internal cavity extending radially between the endwalls, the airfoil shell including at least one extension portion projecting radially from one of the endwalls beyond the radial gas flow path extent, a metallic support carrier for supporting the airfoil shell, the support carrier including a spar extending radially through the internal cavity of the airfoil shell, and an anti-wear clip for blocking against fretting between the airfoil shell and the support carrier. The anti-wear clip may include a body secured to remain stationary with one of the airfoil shell and the support carrier. The anti-wear clip may include an engagement leg extending from the body to engage the other of the airfoil shell and the support carrier to interface between the airfoil shell and the support carrier.

In some embodiments, the anti-wear clip may be secured with the at least one extension portion. The anti-wear clip may extend about the at least one extension portion. The anti-wear clip may include a portion arranged within the internal cavity and a portion outside of the internal cavity. The engagement leg may be arranged within the internal cavity. A bulbous portion of the body may be arranged outside of the internal cavity.

In some embodiments, the anti-wear clip may form an elongated clip. The elongated clip may have a uniform cross-section along the elongated length. The elongated clip may have curvature corresponding to curvature of the at least one extension portion along the elongated length. The engagement leg may contact each of the airfoil shell and the support carrier. The anti-wear clip may remain stationary with the airfoil shell and the support carrier is slidingly engaged with the engagement leg to permit relative movement. In some embodiments, the anti-wear clip may include a plurality of sections disposed at different circumferential positions along the circumference of the at least extension portion. The plurality of sections may be spaced apart from each other.

These and other features of the present disclosure will become more apparent from the following description of the illustrative embodiments.

DETAILED DESCRIPTION OF THE DRAWINGS

Figure 1:
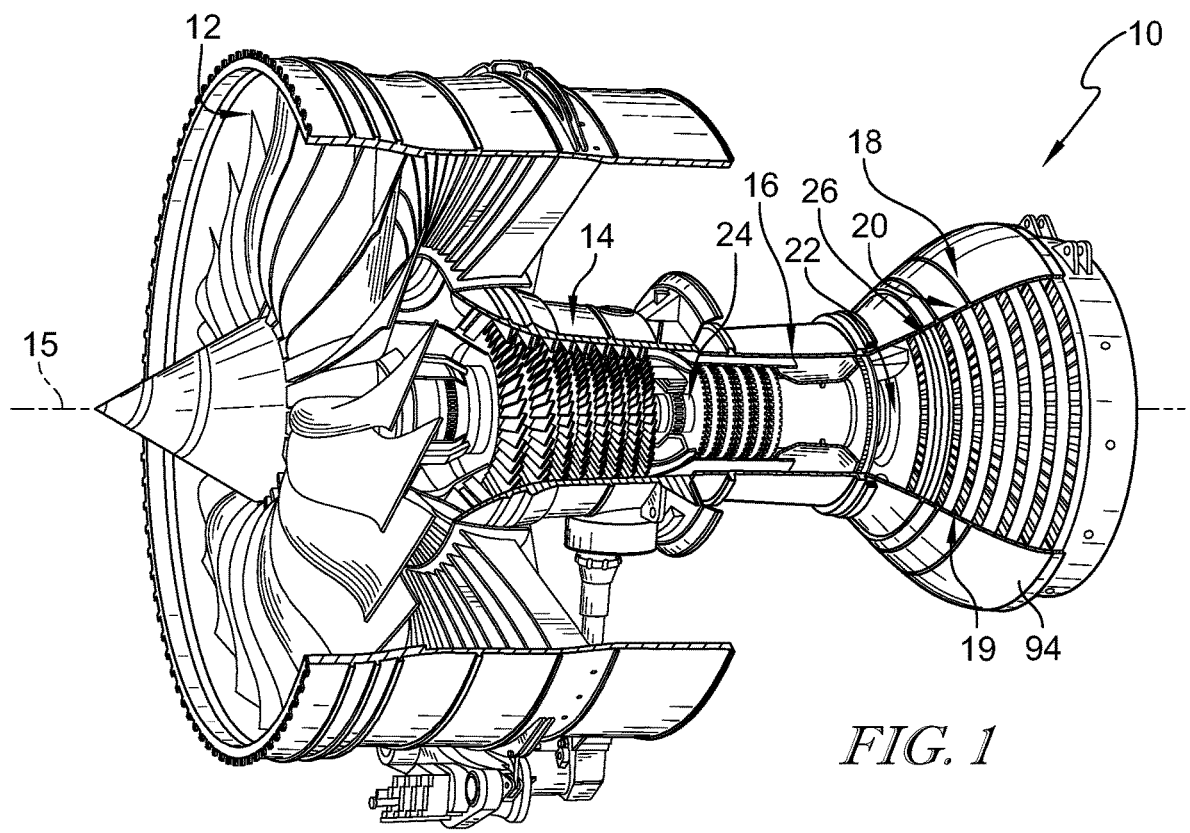
FIG. 1 is perspective view of a gas turbine engine having a portion cutaway to reveal certain internals including an airfoil assembly of the turbine section for guiding hot, high pressure exhaust flow to expand across turbine blades to rotate a rotor.

For the purposes of promoting an understanding of the principles of the disclosure, reference will now be made to a number of illustrative embodiments illustrated in the drawings and specific language will be used to describe the same.

Ceramic materials, including ceramic matrix composites (CMC), can provide advantages to gas turbine engine operation. For example, CMCs can offer excellent performance at high temperatures/pressures while maintaining lower weight than many other materials. Yet, supporting CMCs in adapted uses for engagement with high temperature/pressure exhaust flow can present challenges. For example, interfacing such CMC materials with supporting structures which may include metallic materials can be challenging due to differences in thermal growth between the CMC and the supporting structures along the operating range of the gas turbine engine.

In mating the geometries of ceramic materials with other materials, such as metallics, wear can be of concern. For example, repeated loading between ceramics and other materials can undergo gradual wear to either or both materials by rubbing or gnawing, otherwise referred to as fretting. Such wear can be incurred by repeated loading under different thermal growth rates occurring over the repeated operation of the engine throughout a range of temperatures. Blocking against the effects of fretting can provide increased component lifetime, enhanced performance, reduced rate of failure, and/or ease in assembly and/or maintenance.

In the illustrative embodiment as shown in FIG. 1, a gas turbine engine 10 is shown having an outer portion partly removed to reveal internals for descriptive purposes. The gas turbine engine 10 includes a compressor 14 which compresses air for combustion. The compressed air is mixed with fuel and combusted within a combustor 16 to produce high temperature and/or pressure exhaust flow.

The gas turbine engine 10 includes a turbine section 18 arranged to receive and expand the exhaust flow across its blades 20 to drive a rotor 22 and shaft assembly 24 to provide rotational energy to the compressor 14 and, optionally, a fan 12 for rotation about a rotational axis 15. An airfoil assembly 26 is embodied as a turbine vane assembly engaging with the high temperature and/or high pressure exhaust flow to guide the exhaust flow within the turbine section 18 to engage and drive the blades 20.

Figure 2:
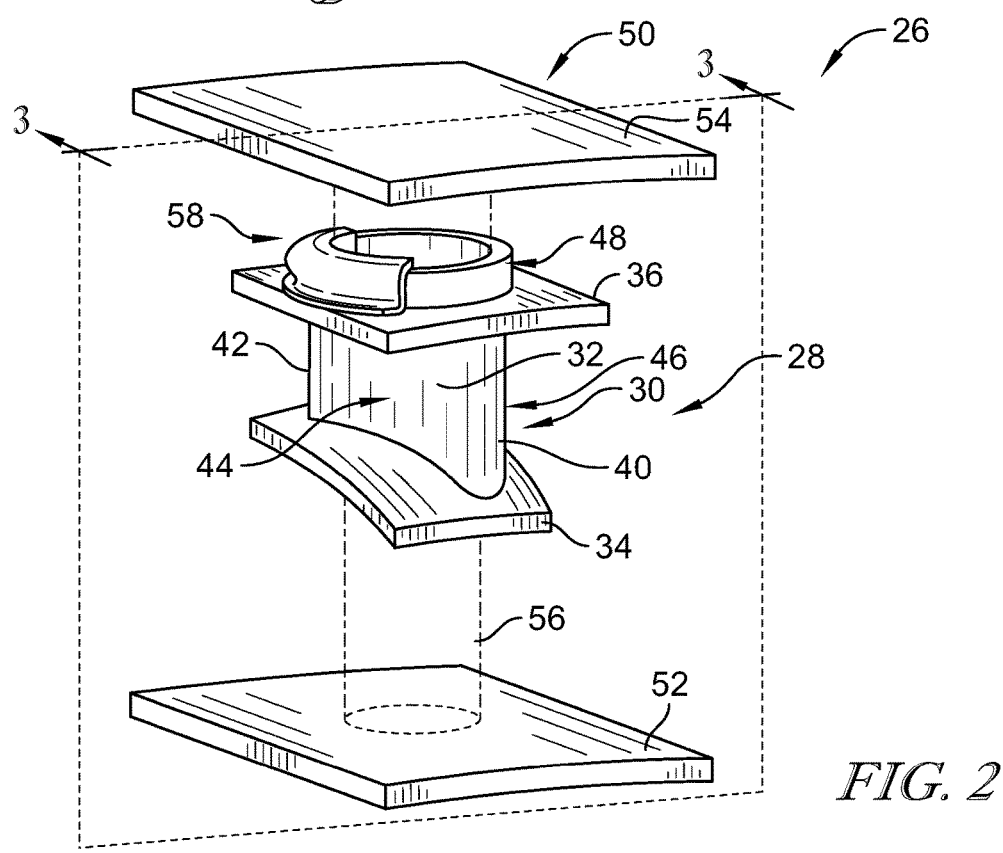
FIG. 2 is a perspective view of the airfoil assembly of FIG. 1 exploded to show that the airfoil assembly includes a ceramic airfoil shell and a carrier arranged to support the airfoil shell (a spar of the carrier being shown artificially elongated for descriptive ease), and an anti-fretting device embodied as an elongated clip secured with the airfoil shell to remain stationary with the airfoil shell and to slidingly engage with the carrier as a liner interface between the airfoil shell and the carrier to block against wear.

As shown in FIG. 2, the airfoil assembly 26 comprises an airfoil shell 28 including a body 30 defining an airfoil shape by its exterior surface 32 for guiding exhaust flow through the gas turbine engine 10. The airfoil shell 28 is illustratively formed of ceramic matrix composite (CMC) materials, for example, silicon carbide (SiC) fiber reinforced matrix. The airfoil shell 28 includes endwalls 34, 36 connected on either radial end of the body 30 to define radial flow path boundaries for the exhaust flow.

The airfoil body 30 of the illustrative airfoil assembly 26 extends radially (up and down in FIG. 2) between the endwalls 34, 36 and includes a leading edge 40 disposed upstream and trailing edge 42 disposed downstream. The airfoil body 30 defines a pressure side 44 and a suction side 46 for guiding exhaust flow. The airfoil shell 28 includes an extension portion 48 extending radially to position and/or support the airfoil body 30 for guiding the exhaust flow.

The airfoil assembly 26 illustratively includes a carrier 50 for connection with the airfoil shell 28 to support the airfoil shell 28 in position to guide the exhaust flow. The carrier 50 is embodied to include an inner portion 52 and outer portion 54. A spar 56 extends between the inner and outer portions 52, 54 (the spar 56 being shown elongated in FIG. 2 for descriptive purposes). In the illustrative embodiment, the carrier 50 is embodied as a metallic carrier for connection with an outer casing of the turbine section 18 to support the airfoil body 30 for guiding the exhaust flow.

The airfoil assembly 26 illustratively includes an anti-fretting device 58 for blocking against fretting between the airfoil shell 28 and the carrier 50. The anti-fretting device 58 is embodied as a clip secured between contact areas of the airfoil shell 28 and the carrier 50 to interrupt direct contact therebetween. The anti-fretting device 58 is secured with one of the airfoil shell 28 and the carrier 50 and engages the other of the airfoil shell 28 and the carrier 50 to block against fretting of the airfoil shell 28 and/or the carrier 50.

Figure 3:
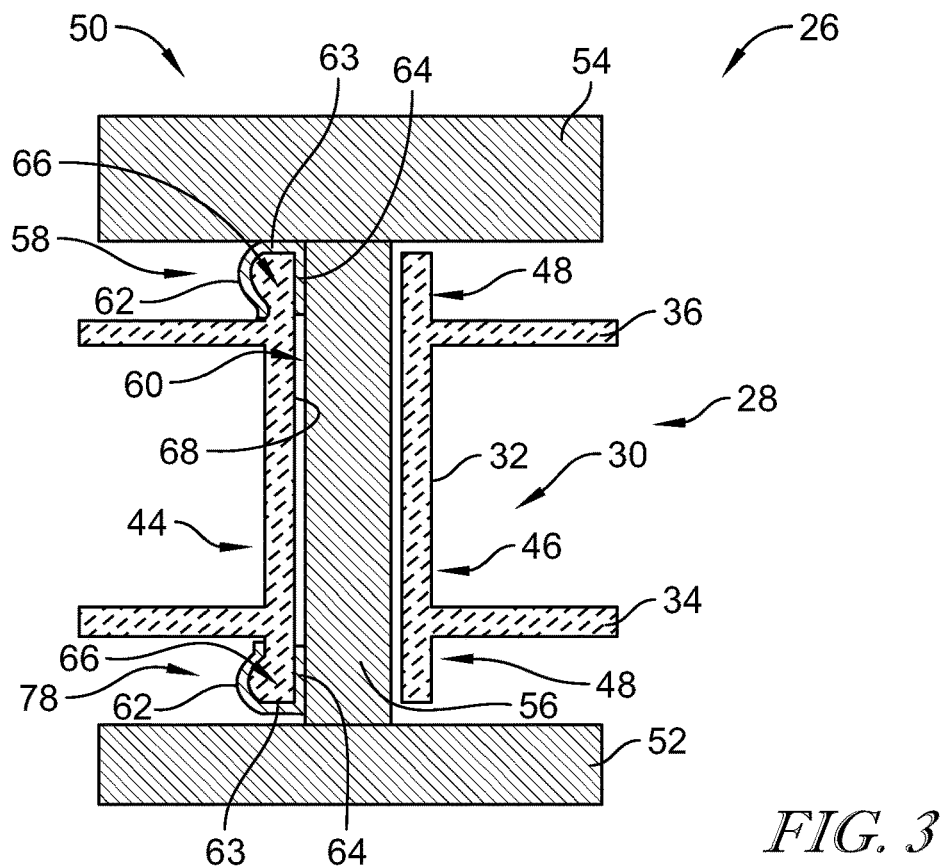
FIG. 3 is a cross-sectional view of the airfoil assembly of FIG. 2 in an assembled state, taken along the plane 3-3 of FIG. 2, showing that the anti-fretting device is secured with the airfoil shell and includes a cross-section having a body defining a curved shape conforming with a thickened end of an extension portion of the airfoil shell and a leg extending from the body into a cavity of the airfoil shell for sliding engagement with the carrier.

As shown in FIG. 3, the airfoil shell 28 illustratively includes a hollow cavity 60 defined through the body 30. The spar 56 extends through the hollow cavity 60 to connect with each of the inner and outer portions 52, 54. The extension portion 48 of the airfoil shell 28 interacts with the carrier 50 for support via the anti-fretting device 58.

The anti-fretting device 58 illustratively includes a body section 62 and an engagement leg 64 extending from the body section 62 for engagement to block against fretting. In the illustrative embodiment of FIG. 3, the anti-fretting device 58 is secured with the airfoil shell 28 to remain stationary relative thereto and the engagement leg 64 is slidably engaged with the carrier 50 to block against fretting, for example, under disparate radial thermal growth between the airfoil shell 28 and carrier 50. In some embodiments, the anti-fretting device 58 may be secured with the carrier 50 to remain stationary relative therewith and having the engagement leg 64 slidably engaged with the airfoil shell 28 to block against fretting. The body section 62 and engagement leg 64 define a cross-section of the elongate body of the anti-fretting device 58.

The anti-fretting device 58 is illustratively embodied to resiliently secure with the airfoil shell 28, although in some embodiments, may be secured with the airfoil shell 28 by any suitable manner. The anti-fretting device 58 is illustratively embodied as secured about the extension portion 48. The body 62 is illustratively formed to have bulbous curvature corresponding with a thickened end 66 of the extension portion 48 to have a conforming fit. A portion 63 of the body 62 extends along the radial end of the extension portion to connect with the engagement leg 64. In some embodiments, the portion 63 may interface between the extension portion 48 and the outer portion 54 of the carrier 50 to avoid fretting. Interface between the portion 63 and outer portion 54 may assist in radially locating the airfoil shell 28 along the spar 56, although is such embodiments, only one of the radially outer or radially inner anti-fretting device (discussed in additional detail below) would provide radial interface with the respective outer or inner portion 54, 52 to allow radial movement of the airfoil shell 28 through thermal growth.

The anti-fretting device 58 is embodied to be formed to have resilient strength to permit elastic bending to allow fitting of the body 62 over the thickened end 66 of the extension portion 48. The engagement leg 64 illustratively connects with the portion 63 of the body 62 generally at a perpendicular angle, and extends from the body 62 into the cavity 60 of the airfoil shell 28. The engagement leg 64 extends radially along an inner wall surface 68 that defines the cavity 60 for sliding engagement with the spar 56. The engagement leg 64 is embodied to have resilient contact with the inner wall surface 68, but in some embodiments, may have suitable spacing from the inner wall surface 68.

As shown in FIG. 3, another anti-fretting device 78 is engaged with a radially inner portion of the airfoil shell 28. The anti-fretting device 78 is illustratively similar to anti-fretting device 58 having a body section 62 and engagement leg 64, although in some embodiments, the anti-fretting devices 58, 78 may be distinct from each other. The anti-fretting device is secured with the radially inner extension portion 48 of the airfoil shell 28 to remain stationary therewith while the engagement leg 64 is slidingly engaged with the spar 56, although in some embodiments may be secured with the carrier 50 and slidingly engaged with the airfoil shell 28. The body section 62 is formed to have a bulbous curvature corresponding with a thickened end 66 of the radially inner extension portion 48.

Figure 4:
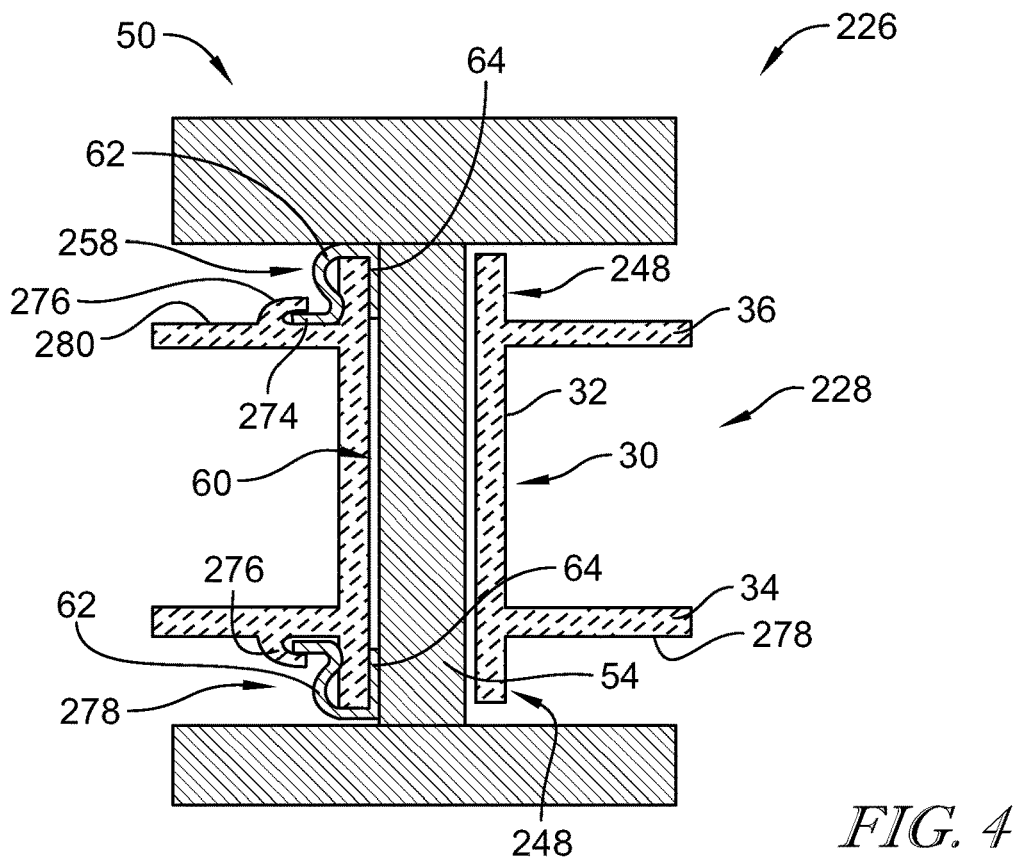
FIG. 4 is a cross-sectional view of another embodiment of the airfoil assembly of FIG. 2 in an assembled state, taken along the plane 3-3 of FIG. 2, showing that the anti-fretting device includes a free end and the airfoil includes a keeper arm engaging with the free end of the anti-fretting device to secure the anti-fretting device stationary relative to the airfoil shell and in sliding engagement with the carrier.

As shown in FIG. 4, another embodiment of an airfoil assembly 226 is similar to the airfoil assembly 26 and the disclosure of airfoil assembly 26 applies equally to airfoil assembly 226 except in instances of conflict with the specific disclosure of airfoil assembly 226. The airfoil assembly 226 illustratively includes an anti-fretting device 258 similar to the anti-fretting device 58 but including a free end 274 of the body 62 extending to engage with a keeper arm 276 of the airfoil shell 228 to retain the anti-fretting device 258 secure. The keeper arm 276 is illustratively formed as a projection from an exterior surface 280 of the endwall 36 curving laterally to define a receptacle for the keeper arm 276.

In the illustrative embodiment, the body 62 of the anti-fretting device includes bulbous curvature to encourage compliant resilience for mounting while the extension portion 248 does not include a thickened end 66 like that of extension portion 48 of the airfoil assembly 26. However, in some embodiments, the extension portion 248 may include a thickened end 66 to additionally secure the anti-fretting device. A radially inward end of the airfoil assembly 226 includes another anti-fretting device 278 similar to anti-fretting device 258. The anti-fretting device 278 is secured with the radially inner extension portion 248 by engagement of the free end 274 with the keeper arm 276. Each of the anti-fretting devices 258, 278 include an engagement leg 64 slidingly engaged with the carrier 50 to block against fretting.

Figure 5:
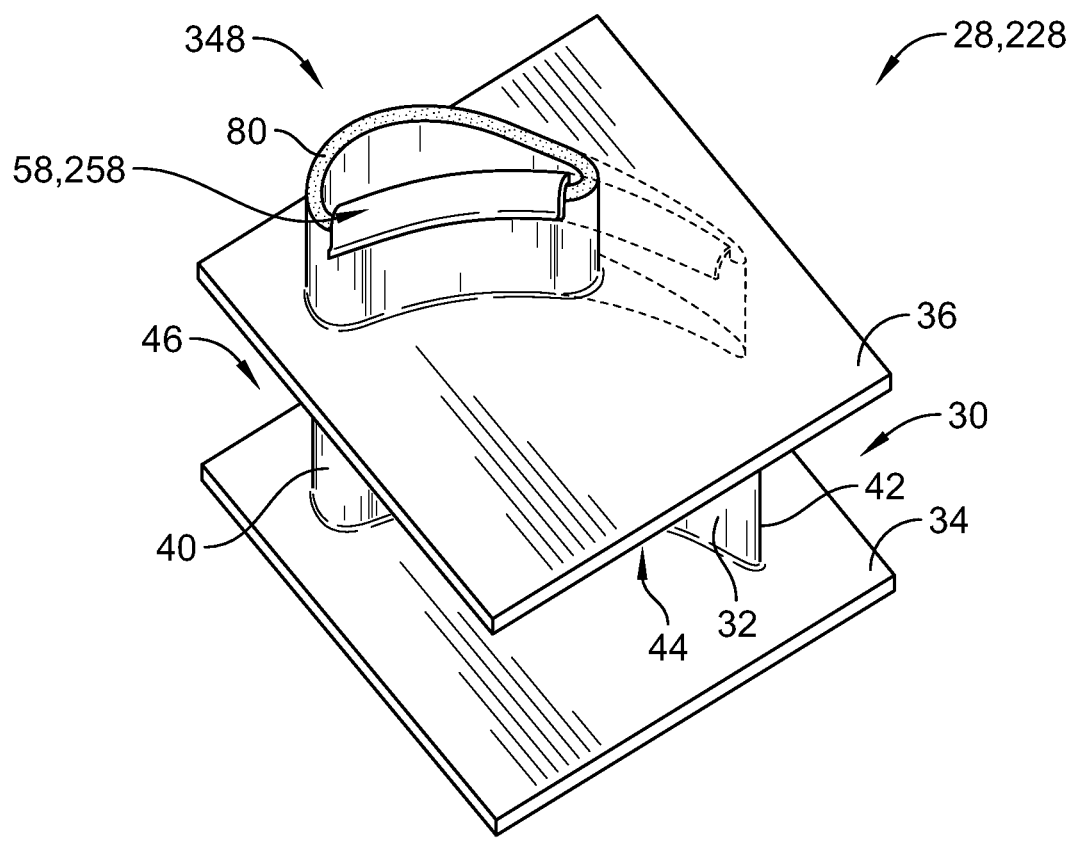
FIG. 5 is a perspective view of the airfoil assembly of FIG. 2 showing that another embodiment of the extension portion of the airfoil shell for connection with the carrier is formed to extend radially having a shape corresponding to the shape of an airfoil body of the airfoil shell, and more particularly to a leading portion (shown in solid line) of the airfoil body, and showing that the extension portion can optionally be formed to have a shape corresponding to the entire airfoil body (shown additionally in dashed line).

The airfoil shell 28, 228 is illustratively formed to include the extension portions 48, 248 as a cylindrical wall extension from the endwalls 34, 36. Referring now to FIG. 5, another embodiment of extension portions 348 for use in the airfoil assembly 26,226 is shown in additional detail. The extension portions 348 are similar to the extension portions 48, 248 and the disclosure of the extension portions 48, 248 applies equally to the extension portions 348 except in instances of conflict with the specific disclosure of extension portion 348. The extension portion 348 includes a wall 80 extending radially outward from the endwall 36 and optionally having the thickened end 66. The extension portion 348 is illustratively shaped corresponding to the airfoil shape of the exterior surface 32 of the airfoil body 30—namely, corresponding to a portion the forward end of the airfoil shape. Optionally, the extension portion 348 and anti-fretting device 58, 258 may be formed to have shape corresponding to the entire airfoil body 30 including the trailing edge portion (shown additionally in dashed line).

Although the illustrative embodiments include extension portions having cylindrical shape or shaped to correspond with the airfoil shape, in some embodiments, the extension portions may be shaped to have any suitable shape including but without limitation ovular, square, and/or other standard or non-standard shapes. In the illustrative embodiments, the anti-fretting device 58, 258, 78, 278 is embodied to extend about a portion of the circumferential dimension of the extension portion 48, 248, 348, but in some embodiments, may have any suitable length of extension about the circumferential dimension, for example but without limitation, may be formed to extend entirely about the circumferential dimension of the extension portion 48, 248, 348 or around any one or more discrete portions of the extension portion 48, 248, 348. In the illustrative embodiment, the spar 56 is shown as cylindrical but in some embodiments, may have any suitable shape including a shape corresponding to the airfoil shape.

Nozzle Guide Vanes (NVGs) of gas turbine engines often react to aerodynamic loads on the airfoil and differential pressure loads across the inner and outer platforms. For NGVs constructed from ceramics such as CMCs, the CMC material may lack the strength to react these loads without an internal support structure made of a stronger material. If the support structure is metallic, then the coefficient of thermal expansion of the support structure and CMC material may be significantly different. This can result in significant relative motion between the CMC and support structure as the system cycles through various temperatures throughout engine operation. This repeated relative motion can cause wear, such as fretting, to one or both of the CMC and support structure. Additionally, if the support structure contains nickel alloys, contact between CMC and nickel alloys of the support structure may cause embrittlement of the CMC materials due to the nickel forming an intermetallic with silicon from the CMC. Applying ceramic coating to the metal can potentially block against such embrittlement, yet, wear such as fretting then may still occur between the coating and CMC.

Within the present disclosure, an interface liner may be installed at locations where the CMC would otherwise contact the support structure. The liner may be formed to be sacrificial. The liner may be clipped onto the CMC structure such that relative motion with the CMC is reduced and/or minimized, and all relative motion occurs between the liner and the support structure to block against fretting of the CMC (or support). The material of the liner may be selected to have good lubricity with the support structure. The material of the liner may be selected to have reduced embrittlement on the CMC. In some embodiments, a ceramic layer may be applied between the liner and CMC, either as a coating directly on the liner or directly on the CMC, to additionally resist embrittlement concerns.

One example of a suitable liner material includes cobalt, such as L605, which can exhibit good lubricity with nickel alloys. Good lubricity can reduce wear between the liner and support structure. Cobalts can form brittle intermetallics with silicon but does so at a slower rate for a given temperature as compare with other materials such as nickel alloys, which can offer the opportunity to reduce the likelihood of embrittlement for certain operating temperature ranges. During maintenance, such as during overhaul, the liner and, if necessary, support structure could be replaced while the CMC structure could be reused.

The present disclosure includes devices, systems, and methods, concerning a liner between a CMC NGV and support structure at locations where CMC transfers load to the support structure. The liner may be fixed with the CMC structure such that relative motion between the liner and CMC is reduced or eliminated, and such that most or all of the relative motion would occur between the liner and support structure. The liner may be intended to be sacrificial in that it receives all or a majority of the fretting wear, thereby enhancing performance of the CMC and possibly support structure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane assembly of a gas turbine engine, the assembly comprising
    a ceramic vane shell including a pair of endwalls defining a radial gas flow path extent and a vane body extending radially between the pair of endwalls and defining an internal cavity extending radially between the pair of endwalls, the vane shell including at least one extension portion projecting radially from one of the pair of endwalls beyond the radial gas flow path extent,
    a support carrier for supporting the vane shell, the support carrier including a spar extending radially through the internal cavity of the vane shell, and
    an anti-wear device for blocking against fretting between the vane shell and the support carrier, the anti-wear device including a body secured to remain stationary with one of the vane shell and the support carrier and an engagement leg extending from the body to engage the other of the vane shell and the support carrier to interface between the vane shell and the support carrier,
    wherein the at least one extension portion includes a thickened radial end corresponding to a shape of the body of the anti-wear device.

2. The vane assembly of claim 1, wherein the anti-wear device is secured with the at least one extension portion.

3. The vane assembly of claim 2, wherein the anti-wear device extends about the at least one extension portion and includes a portion arranged within the internal cavity and a portion outside of the internal cavity.

4. The vane assembly of claim 3, wherein the engagement leg is arranged within the internal cavity.

5. The vane assembly of claim 3, wherein a bulbous portion of the body is arranged outside of the internal cavity.

6. The vane assembly of claim 1, wherein the anti-wear device forms an elongated clip.

7. The vane assembly of claim 6, wherein the elongated clip has a uniform cross-section along the elongated length.

8. The vane assembly of claim 6, wherein the elongated clip has curvature corresponding to curvature of the at least one extension portion along the elongated length.

9. The vane assembly of claim 1, wherein the anti-wear device remains stationary with the vane shell and the support carrier is slidingly engaged with the engagement leg to permit relative movement.

10. A vane assembly of a gas turbine engine, the assembly comprising
    a ceramic vane shell including a pair of endwalls defining a radial gas flow path extent and a vane body extending radially between the pair of endwalls and defining an internal cavity extending radially between the pair of endwalls, the vane shell including at least one extension portion projecting radially from one of the pair of endwalls beyond the radial gas flow path extent,
    a support carrier for supporting the vane shell, the support carrier including a spar extending radially through the internal cavity of the vane shell, and
    an anti-wear device for blocking against fretting between the vane shell and the support carrier, the anti-wear device including a body secured to remain stationary with one of the vane shell and the support carrier and an engagement leg extending from the body to engage the other of the vane shell and the support carrier to interface between the vane shell and the support carrier,
    wherein the vane shell includes a keeper arm extending from one of the pair of endwalls and forming a pocket for receiving a free end of the anti-wear device.

11. An airfoil assembly of a gas turbine engine, the assembly comprising
    a ceramic airfoil shell including a pair of endwalls defining a radial gas flow path extent and an airfoil body extending radially between the pair of endwalls and defining a pressure side, a suction side, and an internal cavity extending radially between the pair of endwalls, the airfoil shell including at least one extension portion projecting radially from one of the pair of endwalls beyond the radial gas flow path extent,
    a metallic support carrier for supporting the airfoil shell, the support carrier including a spar extending radially through the internal cavity of the airfoil shell, and
    an anti-wear clip for blocking against fretting between the airfoil shell and the support carrier, the anti-wear clip including a body secured to remain stationary with one of the airfoil shell and the support carrier and an engagement leg extending from the body to engage the other of the airfoil shell and the support carrier to interface between the airfoil shell and the support carrier,
    wherein the anti-wear clip is formed along only a discrete portion of the pressure side of the at least one extension portion of the airfoil shell,
    wherein the anti-wear clip extends about the at least one extension portion and includes a portion arranged within the internal cavity and a portion outside of the internal cavity so that the anti-wear clip is secured with the at least one extension portion.

12. The airfoil assembly of claim 11, wherein the engagement leg is arranged within the internal cavity.

13. The airfoil assembly of claim 11, wherein a bulbous portion of the body is arranged outside of the internal cavity.

14. The airfoil assembly of claim 11, wherein the anti-wear clip forms an elongated clip.

15. The airfoil assembly of claim 14, wherein the elongated clip has a uniform cross-section along the elongated length.

16. The airfoil assembly of claim 14, wherein the elongated clip has curvature corresponding to curvature of the at least one extension portion along the elongated length.

17. The airfoil assembly of claim 11, wherein the anti-wear clip remains stationary with the airfoil shell and the support carrier is slidingly engaged with the engagement leg to permit relative movement.

18. The airfoil assembly of claim 11, wherein the airfoil shell includes a keeper arm extending from one of the pair of endwalls and forming a pocket for receiving a free end of the anti-wear clip.

19. The airfoil assembly of claim 11, wherein the at least one extension portion includes a thickened radial end corresponding to a shape of the body of the anti-wear clip.

\* \* \* \* \*